Dec. 10, 1946.  F. W. WILLIAMS ET AL  2,412,240
METHOD AND MEANS FOR TESTING FOR IMPERFECTIONS IN VIBRATABLE OBJECTS
Filed July 16, 1943  3 Sheets-Sheet 1
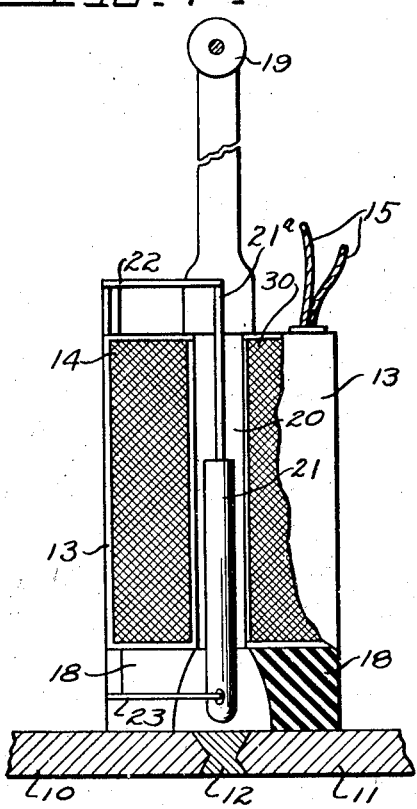
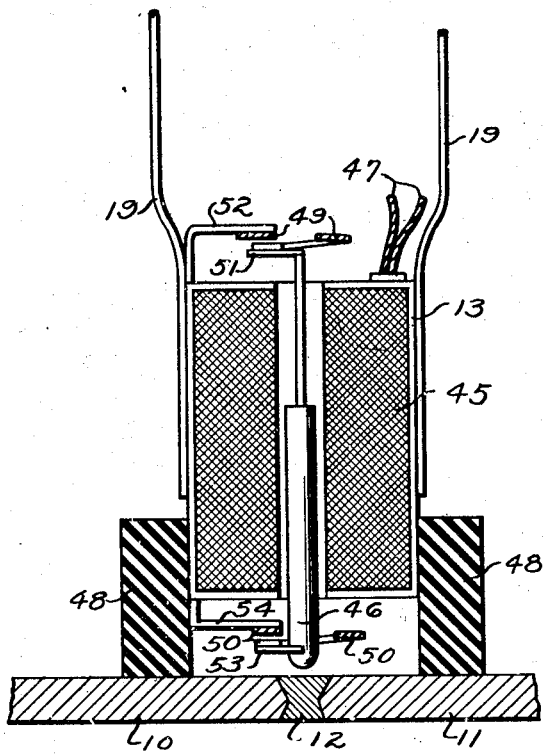
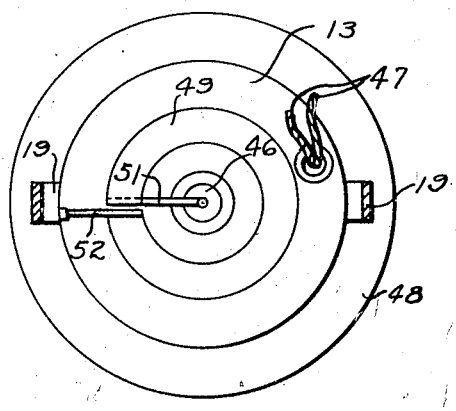
INVENTORS
FRANK W. WILLIAMS
JAMES CLARK
BY Edgar H. Snodgrass
and Clade Koontz
ATTORNEYS

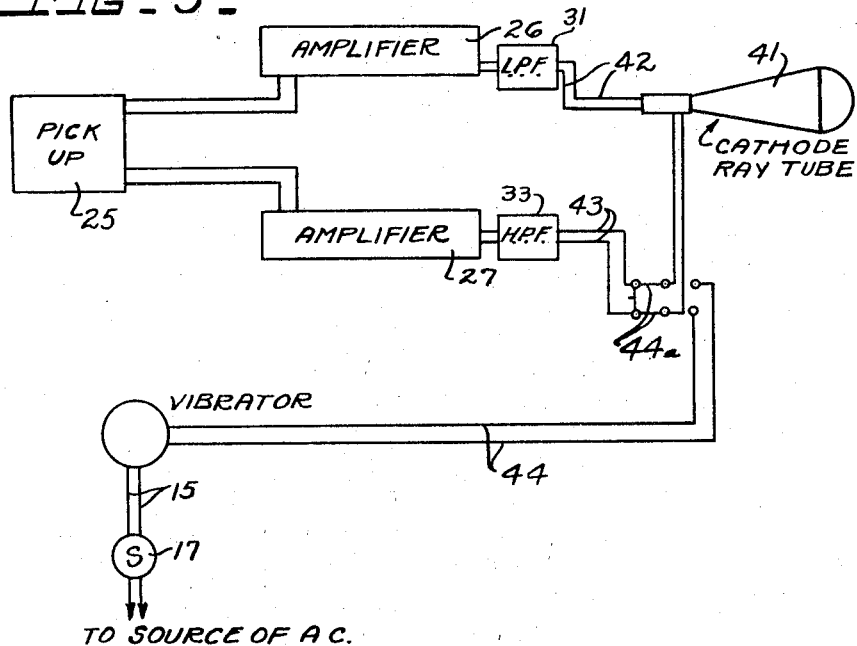
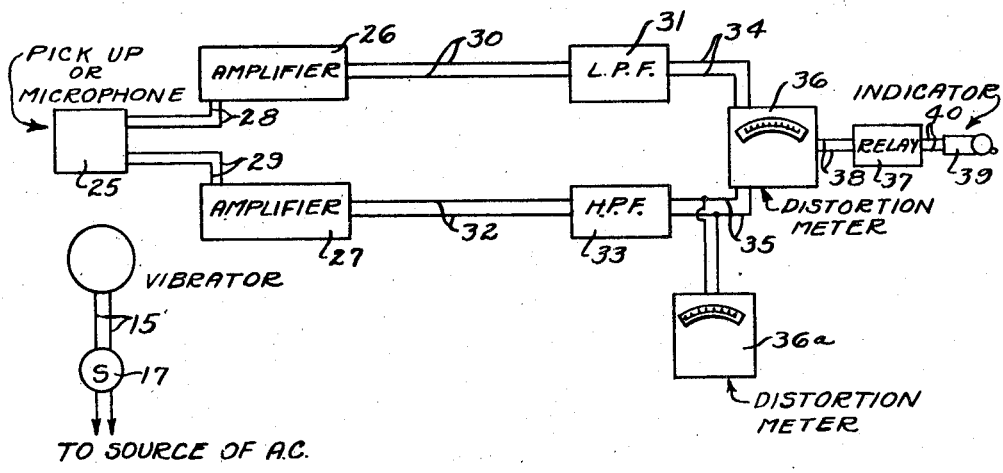

Dec. 10, 1946.  F. W. WILLIAMS ET AL  2,412,240
METHOD AND MEANS FOR TESTING FOR IMPERFECTIONS IN VIBRATABLE OBJECTS
Filed July 16, 1943   3 Sheets-Sheet 3

INVENTORS
FRANK W. WILLIAMS
JAMES CLARK
BY Edgar H. Snodgrass
Clade Koontz
ATTORNEYS Patented Dec. 10, 1946

2,412,240

UNITED STATES PATENT OFFICE 2,412,240

METHOD AND MEANS FOR TESTING FOR IMPERFECTIONS IN VIBRATABLE OBJECTS

Frank W. Williams and James Clark, Dayton, Ohio

Application July 16, 1943, Serial No. 495,076

10 Claims. (Cl. 73—67)

(Granted under the act of March 3, 1883, as amended April 30, 1928; 370 O. G. 757)

The invention described herein may be manufactured and used by or for the Government of the United States of America for governmental purposes, without the payment to us of any royalty thereon.

This invention relates to a method and means for detecting imperfect welds, flaws in castings, weaknesses in riveted joints, etc.

It has been proposed to test a specimen of metal for imperfections by utilizing the natural resonance of the specimen which is vibrated by a dynamo. In this connection see for example the Fessenden Patent No. 1,414,077, dated April 25, 1922. There is a major objection to the employment of the natural resonance of the test object, namely the fact that every article to be tested has its own period of vibration, which greatly complicates the testing, since it is necessary to tune each test object before a test can be run. To detect hair line cracks in welds in steel and other magnetic metal structures, apparatus designed by the Reynolds Tube Co. Ltd., of England is in use particularly in the aircraft industry. However, this apparatus cannot be used unless the metal structure under test is magnetic; and as it requires a heavy current of 400–600 amperes, it is rather costly to operate and requires elaborate safety precautions, which considerably increase the cost of the apparatus. X-ray apparatus is employed to detect flaws in small objects which can be readily moved past the X-ray machine, also to make "radiographs" or film records of large castings. Such apparatus is extremely expensive and heavy and cannot be used in field tests on large objects such as buildings, pipe lines etc.

In contrast with these methods, our invention provides test apparatus employing a vibrator that is a part of a seismic system which operates in resonance with the alternating current which is the source of power, resulting in an efficiency of 90% or more. Another object of the invention is to provide an inexpensive, compact and portable testing apparatus which while useful in the laboratory may also be taken into the field for testing of welded joints, etc., in large structures such as welded pipe lines, buildings and steel ships. Another object is to provide testing apparatus whose measuring instruments may be located at any convenient point, if necessary a considerable distance from the structure under test, yet will give accurate readings at all locations. Another object is to provide a testing method and means which are extremely sensitive and dependable. A further object is to provide apparatus which may give several different types of signals to indicate the presence of imperfections in objects under test. Another object is to provide a method of the character indicated which is just as useful for non-magnetic as for magnetic metals. While one aspect of the invention is the analysis of vibration waves, we also contemplate analyzing sound waves created when the object under test is being struck by a vibrator.

We have discovered that the wave shape of vibrations applied to a welded joint is modified in one way by a good weld and in another manner by an imperfect weld. The modification of the vibration because of the proximity of an unsound weld may develop in one or more of three different ways: (1) the cycles of the vibration may remain of the same frequency but be shifted in phase from the exciter phase; (2) the frequency of the resulting vibration may differ from the frequency of the exciter; (3) the shape of the resulting wave may differ from the wave generated by the exciter. Our method will detect all three modifications of vibrations.

In the accompanying drawings forming a part of this specification,

Fig. 1 is a diagrammatic cross section showing a weld being tested by a vibrator;

Fig. 2 is a diagrammatic cross section of a modified form of vibrator, omitting certain parts;

Fig. 3 is a top plan view of the vibrator of Fig. 2;

Fig. 4 is a wiring diagram showing a complete test apparatus with an optional distortion meter;

Fig. 5 is a wiring diagram of test apparatus for comparing the phase of the received vibrations with the exciter vibrations.

Figure 6:
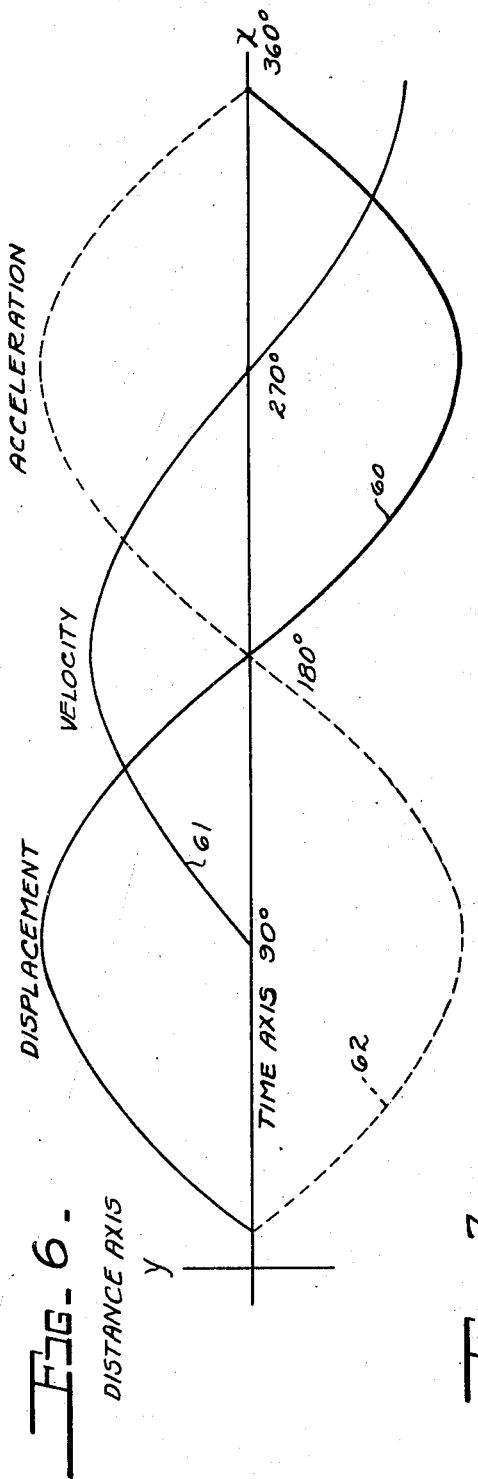
Figs. 6 and 7 are graphs to aid in explaining the operation.

Referring particularly to the drawings, and first to Fig. 1, a pair of metal plates 10, 11 are shown joined by a butt weld 12 whose soundness, it is assumed, is to be tested by the apparatus and method of the invention. To vibrate the weld an exciter or vibrator is employed having a generally cylindrical casing 13, a solenoid 14 within the casing, leads 15 from the solenoid to a source of alternating current, switch 17, a compressible annular collar 18 of rubber or the like secured to the casing, and a handle 19 by which a compression may be imposed upon collar 18. Suspended within the hollow core 20 of the solenoid is a seismic system which in the form of Fig. 1 comprises a metal plunger 21 which is an armature adapted to be vibrated longitudinally by the solenoid, and a pair of flat, parallel, armature-supporting springs 22, 23 whose fixed outer ends are each secured to the casing 13. The free end of lower spring 23 is directly secured to the armature-plunger by brazing. As the armature-plunger has its upper end within the hollow core 20, a non-magnetizable extension arm 21a facilitates the connection of upper spring 22 by bridging the space between the free end of said spring and the upper end of the armature-plunger. This seismic system is shown as suspended out of contact with the walls of the solenoid core and also out of contact with the rubber collar so that its natural resonance or frequency cannot be altered by friction.

In accordance with this invention, the seismic system of the vibrator is so built that it has a frequency exactly equal to the frequency of the electric current which energizes the solenoid when switch 17 closes the circuit. This frequency may be 25, 50 or 60 cycles per second, or if preferred, variable frequency sources may be employed and the current frequency may be anything desired. It is particularly desirable to be able to vary the frequency of the energizing current so as to avoid using a frequency in resonance with the natural frequency of the test object. By employing the frequency of the current we avoid complication of the circuit and are assured of the highest efficiency, since the least possible energy is needed to cause the seismic system to vibrate. Thus the vibrator may be small and compact, yet may be used on the largest structures. It is preferred that the plunger be normally held out of contact with the weld or other part whose soundness is to be tested. However, by pushing down on the handle, the rubber collar is compressed, which brings the tip or lower end of the plunger in contact with the weld. If the seismic system is vibrating, obviously the force which the thrust on the handle imposes on the rubber collar regulates the period of contact of the plunger 21 with the weld, so that the complex vibrations set up in the weld may be made stronger or weaker at the will of the operator.

Now referring to Fig. 4, the preferred test apparatus used in conjunction with the vibrator of Fig. 1 comprises a vibration pickup 25 (which may be a velocity or other type of pickup or even a microphone) to which two amplifiers 26, 27 are connected in parallel by leads 28, 29 respectively. The amplified waves from amplifier 26 are conducted by leads 30 to a filter 31 designed to pass frequencies up to 60 cycles (or frequencies up to the frequency of the vibrator if this differs from 60). The amplified waves from amplifier 27 are conducted by leads 32 to a filter 33 designed to pass frequencies over 60 cycles (or frequencies above that of the vibrator if this differs from 60). Filters 31, 33 are obviously in parallel, and leads 34, 35 from the output sides thereof are also in parallel. Leads 34, 35 are connected to a distortion meter 36 of known construction and having two circuits (not shown) which are so adjusted that the currents passing through them are perfectly balanced when the pickup 25 is applied to a perfect weld. The needle on distortion meter 36 will then read zero. Any change or distortion will create an unbalance in the circuits which will be indicated by a proportionate deflection of the needle. Distortion above a certain minimum (which may be tolerated) will operate a relay 37 through leads 38, and relay 37 may operate an indicator 39 such as a lamp, bell, buzzer, etc., through leads 40. Alternatively, a distortion meter 36a may be connected to the output side of the high pass filter 33 through leads 35 and may measure directly the higher harmonics, which are created by the vibration of metal with a crack or flaw etc. This arrangement gives an indication of the magnitude of the harmonics and makes no comparison between the fundamental and the harmonics of the vibrations.

Instead of the indicator 39, a cathode ray tube 41 may be connected in the circuit by leads 42, 43 (Fig. 5) to give visual indication of the fundamental and harmonic vibrations. The vibrator has leads 44 connected to the cathode ray tube through a double throw switch 44a which may alternatively connect leads 43 with the cathode tube. The two inputs to the cathode ray tube will produce Lissajou's figures on a screen. The shape and slope of these figures accurately indicate the phase relationship of the two inputs. Obviously use of the cathode ray tube will make unnecessary the distortion meter, relay and indicator, but the filters 31 and 33 are used as in Fig. 4 to provide a frequency range in the output of amplifiers 26 and 27.

If the pickup device 25 is a microphone, as suggested above, sound waves are analyzed by the apparatus of Figs. 4 and 5 without change. It is well known that a poor weld when struck a hammer blow gives out a distinctly different sound from that of a good weld. Only by skill obtained from long practice can dependable tests be made by "sounding" welds with a hammer. On the other hand our invention permits accurate and dependable testing by sound waves, without any skill whatever: either distortion meter 36 or 36a or indicator 39 or the cathode ray tube being the only instrument requiring a reading.

The vibrator shown in Figs. 2 and 3 is in some respects superior to the form of Fig. 1 and may be considered the preferred embodiment. Here a solenoid 45 has an armature-plunger 46 and leads 47 extending to the source of energizing current not shown. A compressible collar 48 secured on the lower end permits variable pressure to be imposed on the object under test to vary the period of contact of the plunger 46 as already explained. To support the plunger so that it may vibrate in resonance, a pair of nearly circular flat springs 49, 50 are employed, one at either end of the solenoid. Spring 49 is secured at one end to the plunger by means of a straight metal pin 51 which may be brazed at each end, while the other end of the spring is secured to casing 13 by a similar pin 52. Likewise spring 50 is secured at one end to the plunger by pin 53 and has its other end secured to the casing by a pin 54. Springs 49, 50 hold the plunger out of contact with the solenoid whatever the position of the vibrator. These springs are decidedly more sensitive than the straight flat springs shown in Fig. 1; hence the vibrator of Figs. 2 and 3 may be employed in more delicate and accurate measurements.

In addition to the function already explained, the rubber collars 18, 48 isolate or shield the vibrator from the object under test. The reaction of the vibrating armature-plunger on the vibrator body will tend to move the latter through a distance proportional to the ratio of the masses of the plunger and the vibrator. In other words, the vibrator body as a whole will vibrate, but these vibrations will be displaced 180° in phase compared with the exciter vibrations and if transmitted to the test object would give rise to erroneous readings. The heavy rubber rings or collars 18, 48 prevent the transmission of vibrations of the vibrator body to the test object, the result being that only the impact of the plunger itself is effective in setting up vibrations in the test object.

Referring to Fig. 6, the X axis represents time and the Y axis represents displacement of the plunger. One complete cycle is shown, which as stated above may be anything desired, e. g., 1/60 or 1/300 of a second. For a given pressure on the handle of the vibrator the displacement will be substantially uniform. In this graph displacement upwardly is represented as above the X axis and displacement downwardly is below that axis. The displacement curve 60 of the solenoid plunger 21 (or 46) is a pure sine wave as shown. At the instant of greatest displacement (either upward or downward) the velocity is zero, and the velocity uniformly increases to a point midway of the limits of movement of the plunger, where it attains its maximum value. (In making this last statement the slight effect of gravity on the plunger is ignored.) Thus the velocity curve 61 is also a sine wave but shifted 90° in phase from the displacement curve 60. The acceleration curve 62, on the other hand, is shifted 180° from the displacement curve, and is shown as negative where the displacement values are positive, and vice versa.

Figure 7:
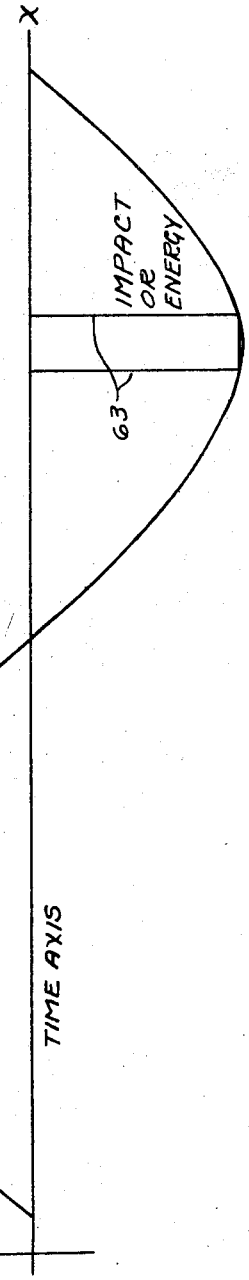

Now referring to Fig. 7, where displacement curve 60 is found again, the impact of the plunger on the test object may be represented by a curve 63 which coincides with the X or time axis except during the brief interval of contact between the plunger tip and the test object, when said curve immediately reaches its maximum value. Curve 63 is thus a straight line joining a series of oblong figures whose areas graphically represent the energy of impact, or the energy employed to set up vibrations in the test object. There is one oblong figure for each cycle because the plunger strikes the test object only at the end of each downward stroke. These oblong figures will be wider, hence their areas will be larger, if the operator pushes down more forcefully on the handle, causing the plunger to hit the test object sooner and harder.

Since the test object has elasticity and mass, it cannot respond to the energy of the impact of the plunger by displacement or vibration in the wave form of curve 63. However, as the wave form of curve 63 is the algebraic sum of a multitude of sinusoidal waves having various frequencies and amplitudes (as may be proved by analysis by the Fourier series, and by other mathematical analysis), and as the test object tends to respond to each and all of these waves, the system of Fig. 4 will be effective in separating, amplifying and comparing the vibrations or waves of flawless test objects with those of objects having cracks and flaws. A flaw or discontinuity will greatly increase the complexity of these waves, usually increasing the amplitude as already indicated.

The cathode ray tube arrangement of Fig. 5 provides a practicable method and means for detecting a shifting of the phase of the exciter waves. The distortion meter 36 (with or without the indicator 39) provides means for comparing the frequency and amplitude of the resulting vibrations with the frequency and amplitude of the exciter vibrations. The alternative distortion meter 36a provides means to detect an increase in amplitude of the resultant waves or vibrations, without a comparison with the fundamental.

It will be clear that both forms of vibrators will operate irrespective of their position, i. e., they need not be vertical as illustrated but may be horizontal or at an angle or even upside down. This is of great practical importance when testing large objects in the field.

While we have shown two forms of vibrator, and apparatus for analyzing vibration or sound waves, it will be understood that the method of the invention may be used with a wide variety of apparatus neither shown or described but known to those skilled in the art. Therefore, we do not wish to be limited by the above description.

Having described our invention, what we claim as new and desire to secure by Letters Patent of the United States is:

1. The method of testing for imperfections in vibratable objects which consists in subjecting the object to rapid blows of a predetermined or fundamental frequency by means of an electrically operated vibrator whose natural resonance is of the same frequency as the electric current which actuates the vibrator; picking up the sound of the blows through a microphone; amplifying the current output from the microphone in two parallel circuits; filtering the current by a low pass filter in one circuit and by a high pass filter in the other circuit; and conducting the filtered currents to a distortion meter having two circuits, to compare the harmonics with the fundamental.

2. The method of testing for imperfections in vibratable objects which consists in subjecting the object to rapidly repeated blows of a predetermined or fundamental frequency; picking up the vibrations thereby induced in the object and transmitting them through parallel circuits and amplifying the vibrations in the parallel circuits; filtering out the harmonics above the predetermined frequency in one circuit and filtering out the harmonics equal to and below the predetermined frequency in the other circuit; and comparing the harmonics of the circuit of higher frequencies with the fundamental.

3. Apparatus of the character described comprising, in combination, a vibrator constructed and arranged to impart vibrations to an object to be tested; a pickup member constructed and arranged to respond electrically to the vibrations of the object to be tested; two amplifiers connected in parallel with the pickup member; a low pass filter and a high pass filter coupled respectively with the output sides of the amplifiers; and a distortion meter to which the output sides of the filters are connected.

4. The invention according to claim 3 wherein there is an indicating device and a relay is connected in series with the distortion meter and the indicating device, so that readings above a certain minimum will give a visible or audible signal at the indicating device.

5. Apparatus of the character described comprising, in combination, a vibrator adapted to impart rapid vibrations to a test object upon being brought into contact with the same; a pickup member constructed and arranged to respond electrically to the vibrations of the object under test; an amplifier electrically connected with the pickup member; a high pass filter on the output side on the amplifier; and a distortion meter on the output side of the high pass filter for measuring the magnitude of the harmonics only.

6. Apparatus of the character described comprising, in combination, a vibrator; a source of alternating current connected to the vibrator; said vibrator having a seismic system having a natural resonance exactly equal to the cycles of the alternating current which sets the seismic system in motion; the seismic system including a plunger of sufficient mass to vibrate the object under test; a pickup member or microphone adapted to be placed on the object under test to pick up vibrations or sound waves; an amplifier electrically connected with the pickup member; and a cathode ray tube connected with the output side of the amplifier and connectible with the vibrator to detect a shifting in phase of the vibrations from the exciter phase.

7. In a weld testing system, a vibrator or exciter adapted to impart sharp blows to a test object at a predetermined frequency remote from the resonant frequency of the test object; a vibration pick-up to receive vibrations transmitted through the weld under test; an amplifier connected to said pick-up; a pair of filter circuits connected to the output of the amplifier; one of said filter circuits adapted to pass currents having a frequency equal to the predetermined vibration frequency; the other of said circuits being adapted to pass currents having a frequency equal to harmonics of the predetermined vibration frequency; and indicating means for comparing the frequency and amplitude of the filter output currents with the frequency and amplitude of the exciter vibrations.

8. In a weld testing system, a vibrator or exciter adapted to impart sharp blows to a test object at a predetermined frequency remote from the resonant frequency of the test object; a vibration pick-up to receive vibrations transmitted through the weld under test; an amplifier connected to said pick-up; a circuit connected to the output of the amplifier; a second circuit having current therein of a frequency equal to the said predetermined frequency; and indicating means connected to both said circuits for giving readings depending on differences in phase between the vibrations excited in the vibrator and those induced in the test object.

9. In a weld testing system, a vibrator or exciter adapted to impart sharp blows to a test object at a predetermined frequency remote from the resonant frequency of the test object; a vibration pick-up to receive vibrations transmitted through the weld under test; an amplifier connected to said pick-up; a filter circuit including a high pass filter connected to the output of the amplifier; and indicating means connected with the filter circuit, said indicating means detecting an increase in amplitude of the harmonics, without a comparison with the fundamental or exciter vibrations.

10. Apparatus of the character described comprising, in combination, a vibrator having an impact element carried by an impact element actuating member forming the body of said vibrator, said vibrator being adapted to excite vibrations in a test object by delivering rapid blows at a predetermined and controllable frequency which is remote from the resonant frequency of the test object; elastically deformable means interposed between and in direct contact with the vibrator body and test object to isolate the vibrator from the object under test so that the only vibrations excited are those created by the rapid blows of the vibrator impact element; an instrument which gives visible readings or audible signals; and means to pick up the vibrations induced in the object under test and transmit them to said instrument in the form of electric waves.

FRANK W. WILLIAMS.
JAMES CLARK.